(12) United States Patent
Josefsson

(10) Patent No.: US 7,712,826 B2
(45) Date of Patent: May 11, 2010

(54) HEATED SEAT FOR A VEHICLE SEAT

(75) Inventor: Daniel Josefsson, Falkoping (SE)

(73) Assignee: Kongsberg Automotive AB, Mullsjo (SE)

( * ) Notice: Subject to any disclaimer, the term of this patent is extended or adjusted under 35 U.S.C. 154(b) by 101 days.

(21) Appl. No.: 11/662,831

(22) PCT Filed: Sep. 13, 2005

(86) PCT No.: PCT/SE2005/001320

§ 371 (c)(1),
(2), (4) Date: Mar. 13, 2007

(87) PCT Pub. No.: WO2006/031183

PCT Pub. Date: Mar. 23, 2006

(65) Prior Publication Data

US 2007/0290533 A1    Dec. 20, 2007

Related U.S. Application Data

(60) Provisional application No. 60/522,342, filed on Sep. 17, 2004.

(30) Foreign Application Priority Data

Sep. 16, 2004 (SE) .................................... 0402232

(51) Int. Cl.
*A47C 7/74* (2006.01)
(52) U.S. Cl. ................................ 297/180.12; 297/217.3
(58) Field of Classification Search ............ 297/180.12, 297/180.11, 217.3; 219/217, 202, 529, 545; 24/306, 442
See application file for complete search history.

(56) References Cited

U.S. PATENT DOCUMENTS

| | | | | | |
|---|---|---|---|---|---|
| 3,063,749 | A | * | 11/1962 | Struble et al. | 297/220 |
| 3,417,229 | A | * | 12/1968 | Shomphe et al. | 219/528 |
| 3,437,792 | A | * | 4/1969 | Lauck | 219/505 |
| 4,308,642 | A | * | 1/1982 | Heyman | 24/306 |
| 4,423,308 | A | * | 12/1983 | Callaway et al. | 219/217 |
| 4,760,980 | A | * | 8/1988 | Sharpe | 245/2 |
| 5,451,725 | A | * | 9/1995 | Goldman | 24/306 |

(Continued)

FOREIGN PATENT DOCUMENTS

DE    3513909 A1 * 10/1986

(Continued)

*Primary Examiner*—David Dunn
*Assistant Examiner*—Tania Abraham
(74) *Attorney, Agent, or Firm*—Steven M. Jensen; Edwards Angell Palmer & Dodge LLP

(57) ABSTRACT

The invention relates to a heated cushion (100) for a vehicle seat, comprising an upper part (110) having a first and a second main surface and a lower part (130) having a first and a second main surface. The parts (110, 130) are arranged with their first main surfaces one against the other and on one first main surface there is disposed a heating coil (120). The upper part (110) and the lower part (130), on their respective first main surfaces, each have one half (115, 135) of a fastening system in Velcro material, and the heating coil (120) is secured in its main surface by the Velcro elements (115, 135) of the main surface. Expediently, at least one part (110, 130) is made in a fabric material.

17 Claims, 2 Drawing Sheets

U.S. PATENT DOCUMENTS

| | | | |
|---|---|---|---|
| 5,778,500 A * | 7/1998 | Illingworth | 24/712.3 |
| 6,552,310 B1 * | 4/2003 | Hulldin et al. | 219/528 |
| 7,131,187 B2 * | 11/2006 | Check et al. | 29/611 |
| 7,244,914 B2 * | 7/2007 | Yoneyama et al. | 219/545 |
| 2004/0100131 A1 * | 5/2004 | Howick et al. | 297/180.12 |

FOREIGN PATENT DOCUMENTS

| | | |
|---|---|---|
| DE | 9319026 U | 3/1994 |
| DE | 4432497 | 3/1996 |
| KR | 2001-0061863 | 7/2001 |
| WO | WO 0206083 A1 * | 1/2002 |
| WO | WO-2004/041585 | 5/2004 |

\* cited by examiner

HEATED SEAT FOR A VEHICLE SEAT

TECHNICAL FIELD

The present invention relates to a heated cushion for a vehicle seat. The heated cushion according to the invention comprises an upper part and a lower part, as well as a heating coil.

BACKGROUND ART

Heated seats and heated cushions for vehicle seats can be found in many different versions. The heat is most often generated by means of electricity which is conducted through one or more so-called heating wires disposed in the seat or the cushion.

In known heated seats or heated cushions, the heating wire is often arranged between two layers in the seat by means of a glue, by which the wire is fixed and the two parts are held together. The holding together of the two layers and the glue-fixing of the wire gives rise, however, to a number of drawbacks: the glues which are used often have an adhesiveness which varies with temperature, above all when the glue ages. This can make the parts come loose, even at relatively low temperatures.

Another problem with parts which are glued together has to do with increased requirements with respect to parts recycling; components which are glued are difficult to take apart and, moreover, the components are "contaminated" with glue when they are taken apart.

Another drawback with parts which are glued together is that in modern vehicle seats there are often ventilation systems present. If the seating surface is covered by a seat whose components are glued, this in itself will prevent good ventilation of the seating surface.

DISCLOSURE OF INVENTION

There is therefore a need for a heated cushion for a vehicle seat which does not have the drawbacks of known cushions of this kind.

This need is met by the present invention in that it discloses a heated cushion for a vehicle seat, which comprises an upper part having a first and a second main surface, and a lower part having a first and a second main surface, in which the parts are arranged with their first main surfaces facing each other.

On one main surface of one part there is disposed a heating coil, and the upper and the lower part each have one half of a fastening system in VELCRO material, the heating coil being secured in its main surface by the VELCRO elements of the main surface.

By virtue of the invention, a heated seat is therefore obtained, whose components can be easily separated from one another for recycling purposes, and whose components additionally have a cohesion which is not dependent on temperature or age.

Nor will the seat components obstruct air flow, which makes it possible to integrate the seat into a vehicle seat having a ventilation system. Expediently, the upper or the lower part of the seat is realized in a fabric material, which further increases the air permeability and increases the possibility of integrating the VELCRO material into the seat parts.

BRIEF DESCRIPTION OF DRAWINGS

The invention will be described in greater detail below with reference to the appended drawings, in which.

EMBODIMENTS

Figure 1:
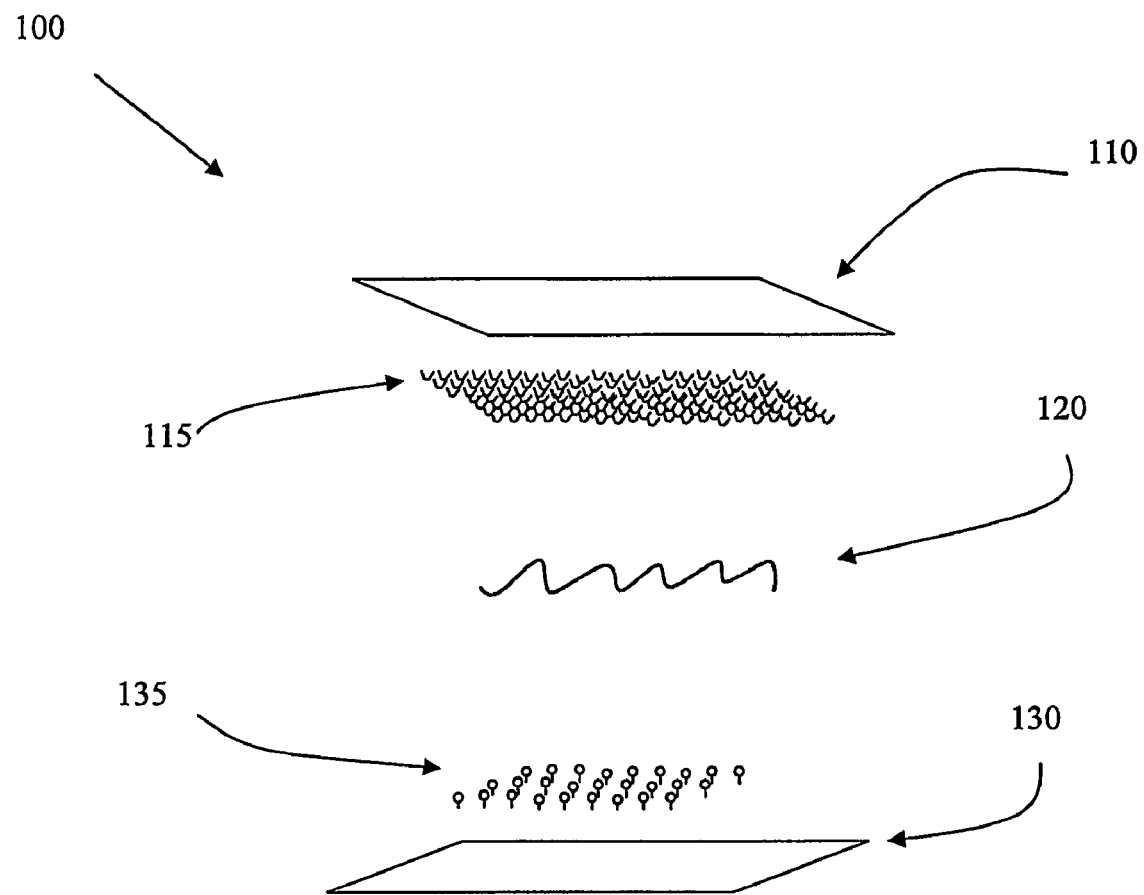
FIG. 1 shows the components in a heated seat according to the invention.

FIG. 1 illustrates the basic component parts in a heated seat 100 according to the invention. As can be seen from the drawing, the seat 100 comprises an upper part 110 and a lower part 130, both of which preferably are substantially flat and have a first and a second main surface. The respective first main surfaces of the two parts 110, 130 are intended to be arranged one against the other in the resulting seat 100.

Another one of the components in the seat 100 is a heating wire 120, which is connected to an external system (not shown in FIG. 1 or FIG. 2) in order to make the wire give off heat. The external system is usually an electrical system in the vehicle, which can comprise a control system for controlling the quantity of heat which is given off.

For fixing the heating wire 120 in the seat 100 and for holding together the two parts 110 and 130, various types of wet or dry glues are traditionally used, in which the dry glues, for example, can be heat-activated. As stated above, this has a number of drawbacks, such as that it makes it difficult, for example, to take the seat apart for possible recycling, that the adhesiveness varies with age and ambient temperature, and that seat ventilation is made more difficult.

In order to solve these problems, the seat 100 according to the invention is equipped with an alternative system for holding together the seat and for fixing the heating coil 120; the upper part 110 and the lower part 130, on their respective first main surfaces, each have one half 115 and 135 respectively of a fastening system in VELCRO material (more commonly referred to as "hook and loop").

The VELCRO elements 115 and 135 are shown in FIG. 1 as separate from the seat parts 110, 130, but are intended to be disposed on the first main surface of the respective seat part so that they will be facing one another. The VELCRO elements 115, 135 can, of course, be fastened to their respective main surfaces in a variety of ways within the scope of the invention, but in a preferred embodiment at least one of the parts 110, 130 is made in a fabric material. Preferably, both the parts 110, 130 are made in fabric, which makes it possible to integrate the VELCRO elements 115, 135 into the fabric.

For fixing the heating wire 120 in the desired position in the seat 100, the VELCRO elements 115, 135 are used. In the finished seat 100, elements from both surfaces will combine to fix the wire 120, but in a manufacturing phase only VELCRO elements belonging to one surface are initially used. This involves, in the manufacture or assembly of the seat 100, the heating wire 120 being pressed down against the VELCRO surface 115, 135 so that the individual VELCRO elements enclose the wire, and hold it on the main surface of the particular part 110, 130.

Expediently but not necessarily, the heating wire 120 is placed or pressed onto the VELCRO surface, which is constituted by hooks or the like, the latter clasping and encompassing the wire until the second main surface is applied.

Figure 2:
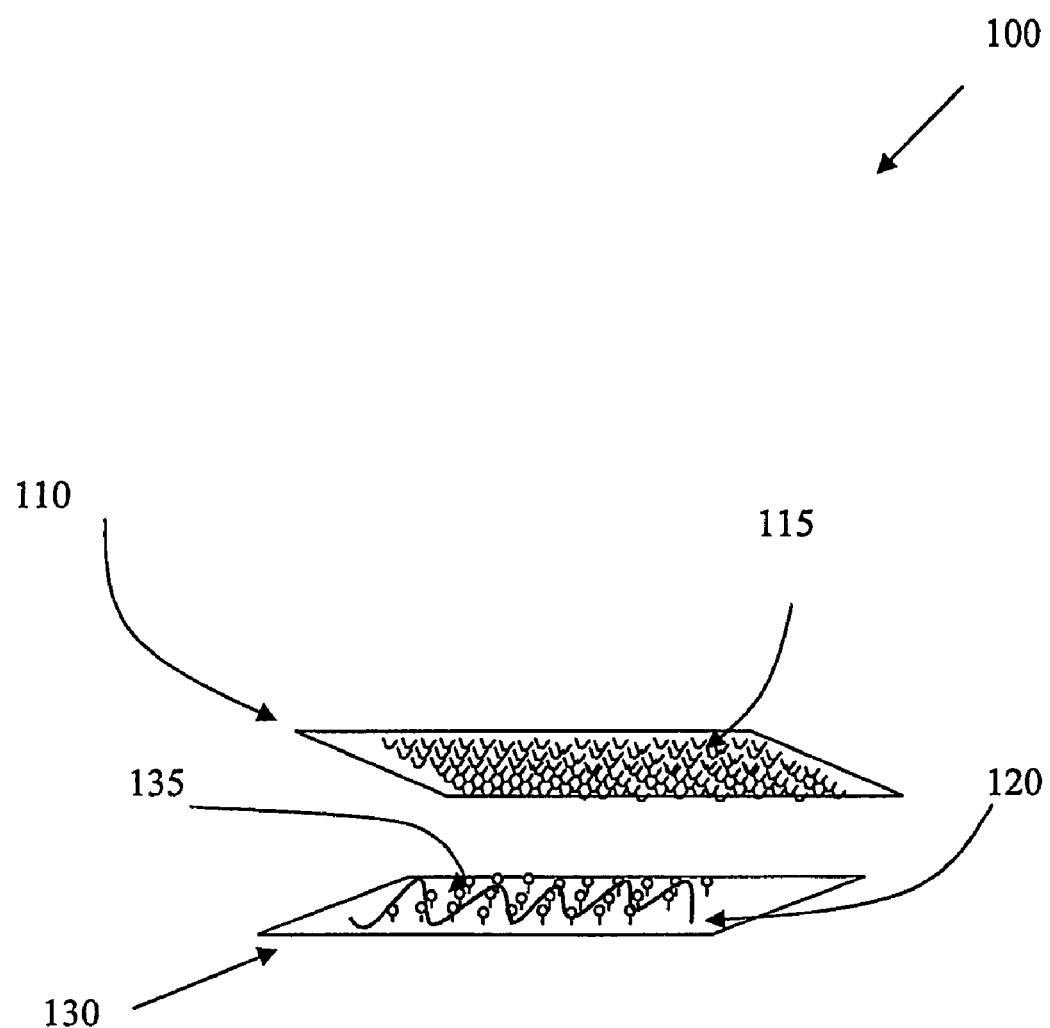
FIG. 2 shows how the components from FIG. 1 are meant to be assembled.

This is shown in FIG. 2, in which the wire 120 has been clamped in the VELCRO element 135 of the lower part 130, whereafter the upper part 110 is applied to the lower part and the VELCRO surfaces 115, 135 mutually engage. When the upper and the lower part are mutually engaged, the VELCRO elements from both surfaces will enclose the heating wire 120 and combine to fix it in the desired position in the seat 100.

By virtue of the invention, a heated seat for a vehicle seat has therefore been obtained, which is easy to take apart for recycling, which does not obstruct ventilation of a vehicle seat, since the principal elements can be made of fabric, and the securement of which is not dependent on temperature or age.

The invention claimed is:

1. A heated cushion for a vehicle seat, comprising:
   a first part having a first surface;
   a second part having a second surface, the first and second surfaces arranged to face each other;
   a first hook and loop fastening layer arranged on the first surface of the first part;
   a second hook and loop fastening layer arranged on the second surface of the second part; and
   a heating wire positioned between the first and second hook and loop fastening layers such that the heating wire is fixed to the heated cushion only by at least one of the first and second hook and loop fastening layers,
   wherein the heating wire is pressed onto at least one of the first and second hook and loop fastening layers.

2. The heated cushion of claim 1, wherein the heating wire is held between the first and second hook and loop fastening layers that are mutually engaged.

3. The heated cushion of claim 2, wherein the heating wire is enclosed by the first and second hook and loop fastening layers.

4. The heated cushion of claim 1, wherein the heating wire is unattached to the first and second parts when the first and second hook and loop fastening layers are engaged.

5. The heated cushion of claim 1, wherein the heating wire is applied directly to at least one of the first and second hook and loop fastening layers without being connected to the first and second parts.

6. The heated cushion of claim 1, wherein the heating wire is removable from the heated cushion by disengaging the first and second hook and loop fastening layers.

7. The heated cushion of claim 1, wherein at least one of the first and second parts is made of fabric.

8. The heated cushion of claim 1, wherein the first and second parts are made of fabric.

9. A method for producing a heated cushion for a vehicle seat, comprising the steps of:
   providing a first part having a first surface;
   providing a second part having a second surface, the first and second surfaces arranged to face each other;
   attaching a first hook and loop fastening layer to the first surface of the first part;
   attaching a second hook and loop fastening layer to the second surface of the second part;
   pressing a heating wire against at least one of the first and second hook and loop fastening layers, such that the heating wire is fixed to the heated cushion only by the at least one of the first and second hook and loop fastening layers; and
   engaging the first and second hook and loop fastening layers to enclose the heating wire between the first and second hook and loop fastening layers.

10. The method of claim 9, wherein the heating wire is held between the first and second hook and loop fastening layers that are mutually engaged.

11. The method of claim 9, wherein the heating wire is unattached to the first and second parts when the first and second hook and loop fastening layers are engaged.

12. The method of claim 9, wherein the heating wire is applied directly to at least one of the first and second hook and loop fastening layers without being connected to the first and second parts.

13. The method of claim 9, further comprising the step of:
   disengaging the first and second hook and loop fastening layers to remove the heating wire.

14. The method of claim 9, wherein at least one of the first and second parts is made of fabric.

15. The method of claim 9, wherein the first and second parts are made of fabric.

16. A heated cushion for a vehicle seat, comprising:
   a first part having a first surface;
   a second part having a second surface, the first and second surfaces arranged to face each other;
   a first hook and loop fastening layer arranged on the first surface of the first part;
   a second hook and loop fastening layer arranged on the second surface of the second part; and
   a heating wire positioned between the first and second hook and loop fastening layers such that the heating wire is fixed and held by at least one of the first and second hook and loop fastening layers,
   wherein the heating wire is pressed onto at least one of the first and second hook and loop fastening layers.

17. The heated cushion of claim 16, wherein the heating wire is fixed to the heated cushion only by the at least one of the first and second hook and loop fastening layers.

* * * * *